Patented Aug. 5, 1924.

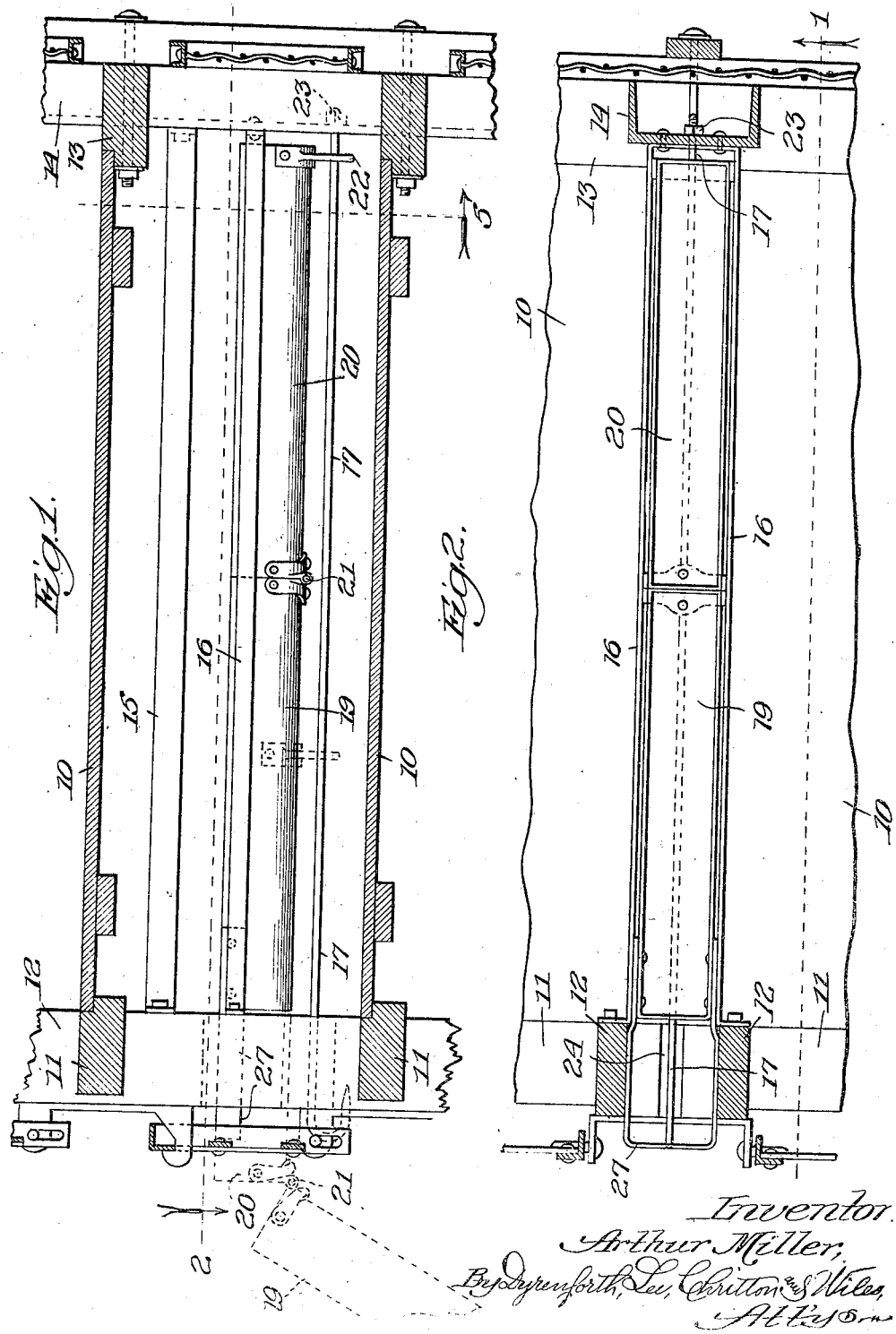

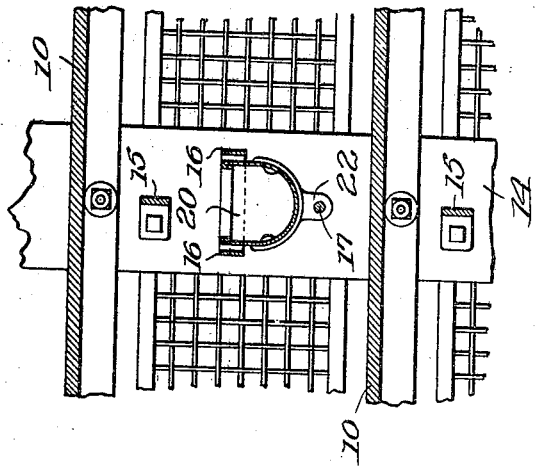
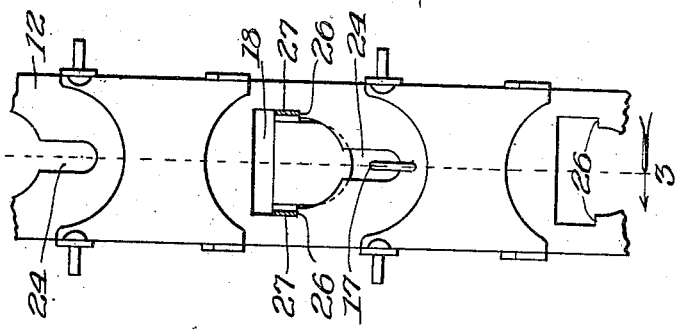
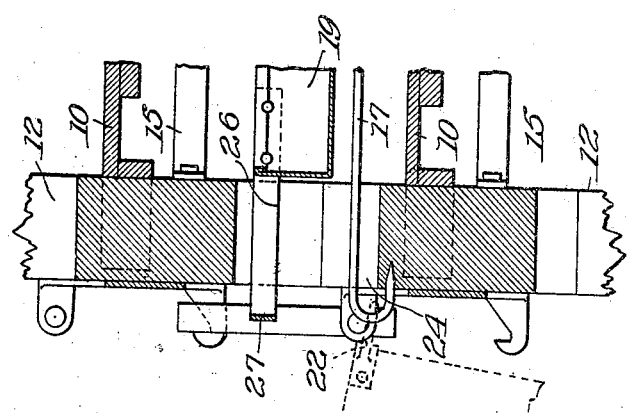

1,503,843

UNITED STATES PATENT OFFICE.

ARTHUR MILLER, OF CHICAGO, ILLINOIS, ASSIGNOR, BY MESNE ASSIGNMENTS, TO EQUIPMENT DEVICES COMPANY, A CORPORATION OF DELAWARE.

TROUGH FOR POULTRY CARS.

Application filed August 22, 1923. Serial No. 658,821.

*To all whom it may concern:*

Be it known that I, ARTHUR MILLER, a citizen of the United States, residing at Chicago, in the county of Cook and State of Illinois, have invented a new and useful Improvement in Troughs for Poultry Cars, of which the following is a specification.

This invention relates to troughs for poultry cars and the like and is fully described in the following specification and shown in the accompanying drawings, in which—

Figure 1 is a partial transverse section through a poultry car;

Fig. 2 is a horizontal section on the line 2 of Fig. 1;

Fig. 3 is a partial vertical section on the line 3 of Fig. 4;

Fig. 4 is a partial front elevation and

Fig. 5 is a partial section on the line 5 of Fig. 1.

The poultry car to which this invention is applied is of the usual type, having a longitudinal central aisle on each side of which is arranged a series of coops placed in tiers, one above the other. Fig. 1 shows the cross-section through one of these coops, which have floors 10, which are supported on the aisle side by stringers 11, which are carried by the aisle posts 12, and on the outer side by stringers 13, which are carried by the vertical channel posts 14.

The adjacent coops of the same tier are separated by partitions composed of the bar 15, the two parallel guides 16 and the rod 17. The aisle post 12 has an opening 18 cut therein, which permits a trough to be drawn therethrough in a well known manner. This trough is made up of two sections, an inner section 19 and an outer section 20, hingedly secured together by means of a pin 21 near the bottom of the trough, the outer section 20 having an eye 22 at the outer end, which is slidable over the rod 17. One end of this rod is secured by means of a nut 23 to the channel post 14, while the opposite or aisle end passes through a narrow opening 24, which is a continuation of the opening 18 in the aisle post. The inner end is then curved at 24 and secured to the aisle post 12.

The opening 18 in the aisle post 12 is provided with two shoulders 26 on which rests the handle 27, which is secured to the inner end of the trough member 19, when the trough is in normal operative position, at which time the guide wires 16 serve to maintain the trough in its normal upright position.

To remove the trough into the aisle for the purpose of dumping and cleaning it, the operator grasps the handle 27 raising it so that the rounded bottom of the trough member 19 will clear the rounded bottom of the opening 18, and draws the trough bodily through the opening into the aisle. When the hinge pin 21 passes the front of the aisle post 12, the trough member 19 may be lowered, as shown in dotted lines in Fig. 1, thereby rendering this trough member easily accessible for dumping and cleaning. It will be understood that this operation cannot now be performed with any of the well known forms of troughs used in poultry cars for the reason that the long integral troughs now in use are considerably longer than the width of the aisle between the aisle posts so that only a portion of the trough can be drawn into the aisle.

Having cleaned the trough section 19, the operator can then draw the outer section 20 into the aisle, as shown in Fig. 3, so that it too is made accessible for cleaning.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

I claim:

1. In a poultry car, a central aisle, a row of coops at one side of said aisle, adjacent coops having a dividing partition, a trough made up of a plurality of sections hinged together at the bottom and forming part of said partition, whereby said trough sections may be drawn into the aisle and lowered, and means for preventing separation of said sections from the partition.

2. In a poultry car, a central aisle, a row of coops at one side of said aisle, adjacent coops having a dividing partition, a trough made up of a plurality of sections hinged together at the bottom and forming part of said partition, a rod in said partition, a member carried by said trough engaging said rod, whereby said trough sections may be drawn into the aisle and lowered, and means for preventing separation of said sections from the partition.

3. In a poultry car, a central aisle, a row of coops at one side of said aisle, adjacent coops having a dividing partition, a trough made up of a plurality of sections hinged together at the bottom and forming part of said partition, a rod in said partition, and a member carried by said trough engaging said rod, said rod having a hooked end extending beyond said partition so that the trough sections may be drawn into the aisle and dumped.

ARTHUR MILLER.